United States Patent [19]
Alberici

[11] Patent Number: 5,992,925
[45] Date of Patent: Nov. 30, 1999

[54] INSTRUMENT PANEL CROSS BEAM SIDE ATTACHMENTS

[75] Inventor: Eduardo Alberto Alberici, Rochester Hills, Mich.

[73] Assignee: General Motors Corporation, Detroit, Mich.

[21] Appl. No.: 09/046,860

[22] Filed: Mar. 24, 1998

[51] Int. Cl.[6] .................................................. B62D 25/08
[52] U.S. Cl. .................... 296/203.02; 296/72; 280/779
[58] Field of Search .............................. 296/203.02, 194, 296/70, 72, 192; 280/779

[56] References Cited

U.S. PATENT DOCUMENTS

| | | | |
|---|---|---|---|
| 5,238,286 | 8/1993 | Tanaka et al. | 296/194 X |
| 5,282,637 | 2/1994 | McCreadie | 296/203.02 |
| 5,868,426 | 2/1999 | Edwards et al. | 280/779 |

*Primary Examiner*—Dennis H. Pedder
*Assistant Examiner*—Patricia Engle
*Attorney, Agent, or Firm*—Jeffrey A. Sedlar; Kathryn A. Marra

[57] ABSTRACT

Side attachment assemblies are provided for mounting an instrument panel cross car support beam structure or the like to right and left hand cowl panels of a vehicle body. Each attachment assembly includes a support member mountable on one of the cowl panels and including an upwardly facing planar supporting surface; an end member mountable on an end of the support beam and including a lower supported surface engaging the supporting surface of the support member and a pair of acutely angled longitudinally spaced locking surfaces extending upward from the supported surface; a wedge member engaging at least one of the locking surfaces of the support member, the other of the locking surfaces engaging a mating surface on one of said wedge member and the support member for retaining the end member on the supporting surface of said support member; and a fastener urging the wedge member toward the support member and holding the wedge member against at least one of the locking surfaces of the end member to maintain all of the members in assembly. Various alternative embodiments are disclosed.

14 Claims, 4 Drawing Sheets

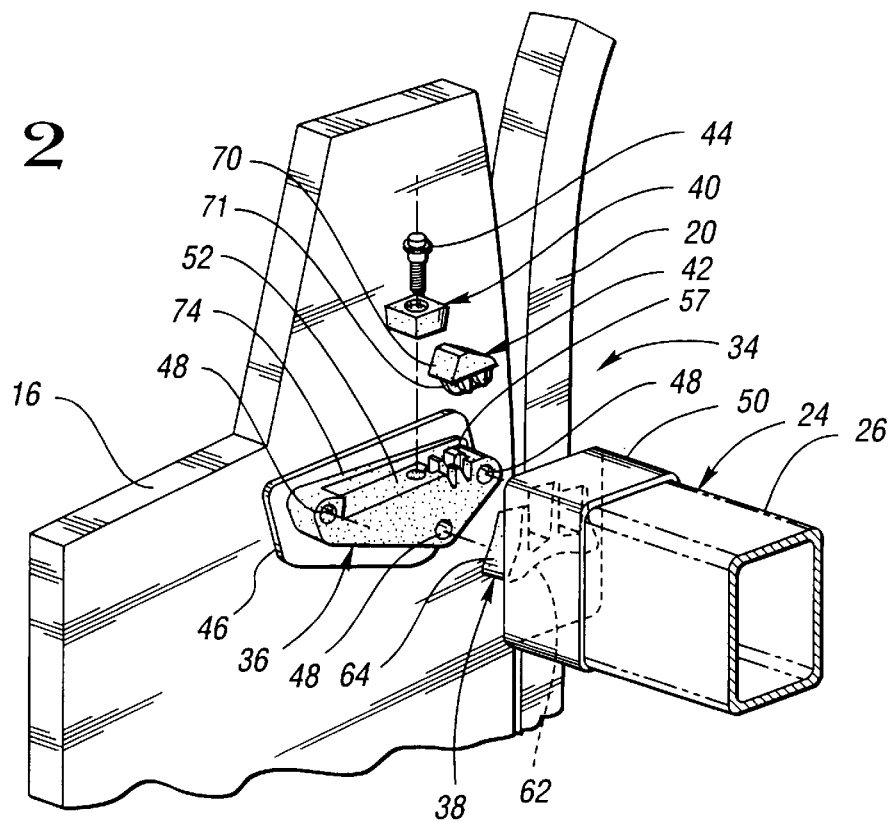

INSTRUMENT PANEL CROSS BEAM SIDE ATTACHMENTS

TECHNICAL FIELD

This invention relates to side attachment assemblies that mount a cross car support beam supporting an instrument panel and optionally other components on the cowl side panels of a vehicle body.

BACKGROUND OF THE INVENTION

It is known in the art relating to automotive vehicle bodies to provide a cross car beam mounting or forming a part of an instrument panel assembly which is supported in the vehicle solely by attachment to the cowl side panels of the body. The beam may be a simple member or a complex structure, such as an aluminum or magnesium casting designed to integrate into the assembly additional components such as a vehicle heating, ventilating and air conditioning system, steering column and accelerator and brake controls, as well as other items usually mounted in the vehicle instrument panel or dash. Conventional means of assembling such cross car beams utilizing multiple nuts and bolts can be difficult to align and generally requires attachment from inside the vehicle body. An alternative arrangement provides wedge shaped slides on the vehicle's side pillars which receive wedge shaped end plates on the ends of a cross car beam, allowing installation of the beam by sliding the plates forward into the wedge slides. A single screw then attaches the beam ends to the pillars, but attachment of the assembly is still required from inside the vehicle body.

SUMMARY OF THE INVENTION

The present invention provides improved mounting means in the form of a pair of side attachment assemblies for an instrument panel cross car beam structure or the like. The side attachment assemblies each include a support member that is mountable on one of the cowl panels and includes an upwardly facing planar supporting surface; an end member mountable on or integral with an end of a cross car support beam, the end member including a lower supported surface engaging the supporting surface of the support member and a pair of acutely angled longitudinally spaced locking surfaces extending upward from the supported surface; a wedge member engaging at least one of the locking surfaces, the other of the locking surfaces engaging a mating surface on either the wedge member or the support member for retaining the end member on the supporting surface of the support member; and fastener means urging the wedge member toward the support member and holding the wedge member against at least one of the locking surfaces of the end member to maintain all the members in assembly.

The fastener means consists of a single bolt or screw which is installed through the windshield opening of the vehicle body from the outside of the vehicle, the screw passing through the wedge member and into the support member to hold the end member against the support member in a fixed location. Angled side walls on the support member and the outer end of the associated end member act to assist in centering the associated cross beam assembly during installation carried out by sliding the beam forward while the attached pair of end members are seated on the supporting surfaces of an associated pair of support members.

Rectangular wedge members allow for variations in the transverse distance between the body cowl panels on which the support members are mounted prior to installation of the cross car beam. In an alternative embodiment, one of the wedge members has semi-conical front and rear ends which mate with correspondingly formed recesses in the associated end member to restrain the beam in a transverse direction as well as in longitudinal and vertical directions. The wedge and end member on the other end of the beam have straight angled front and rear ends which allow for variations in the transverse distance prior to tightening of the fasteners to lock the beam to the vehicle cowl panels.

These and other features and advantages of the invention will be more fully understood from the following description of certain specific embodiments of the invention taken together with the accompanying drawings.

BRIEF DESCRIPTION OF THE DRAWINGS

In the drawings:

FIG. 2 is an exploded perspective view showing the components of the side attachment assembly and their relation to the vehicle cowl and cross car beam members;

FIG. 3 is a longitudinal cross-sectional view through the side attachment assembly of FIG. 2 in the plane of the attaching bolt;

DESCRIPTION OF THE PREFERRED EMBODIMENTS

Figure 1:
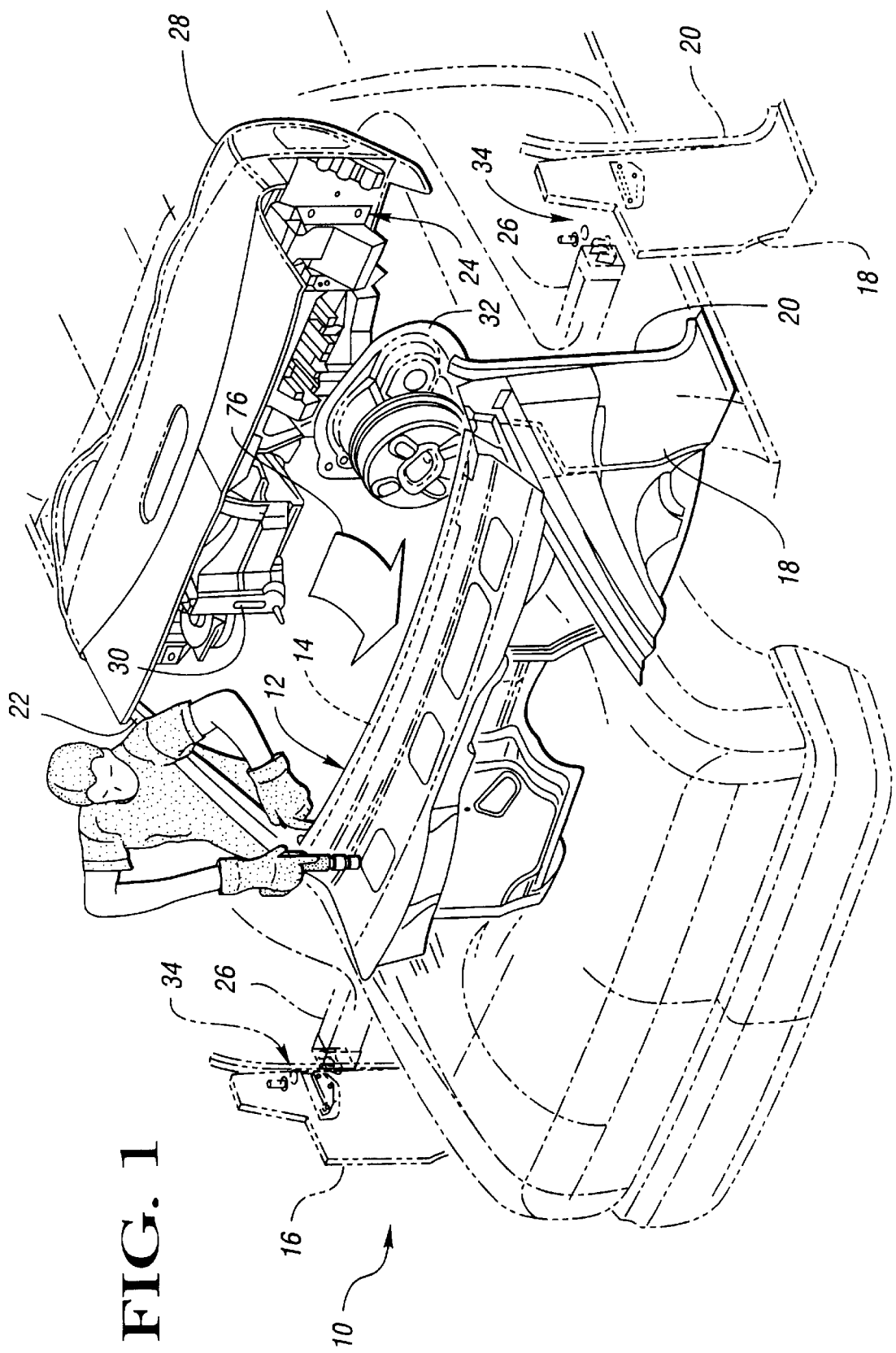
FIG. 1 is a perspective view of a representative vehicle body illustrating the installation of a cross car beam assembly.

Referring first to FIG. 1 of the drawings in detail, numeral 10 generally indicates an automotive vehicle body shown partially in phantom lines. Body 10 includes a plenum 12 having an upper panel 14 and interior cowl side panels 16, 18 formed with vertical front door frames 20 extending upward and forming windshield pillars 22.

A vehicle instrument panel and cross car beam assembly 24 is shown positioned inside the vehicle body 10 ready to be moved forward into position for installation in the body 10. The beam assembly 24 includes a structural cross car beam 26 on which is mounted the instrument panel 28 and additional components, including, a heating ventilating and air conditioning unit 30, steering column and braking equipment 32 and other items, not illustrated, associated with the instrument panel 28 and the attached equipment such as a steering wheel and brake and accelerator pedals, not shown.

The cross car beam 26 may assume any suitable form, such as a simple beam or a structure with complex shapes for mounting various elements of the assembly 24. The beam 26 and its associated components are secured to the cowl side panels 16, 18 by side attachment assemblies generally indicated by numeral 34 and illustrated in detail in FIGS. 2–4.

Figure 4:
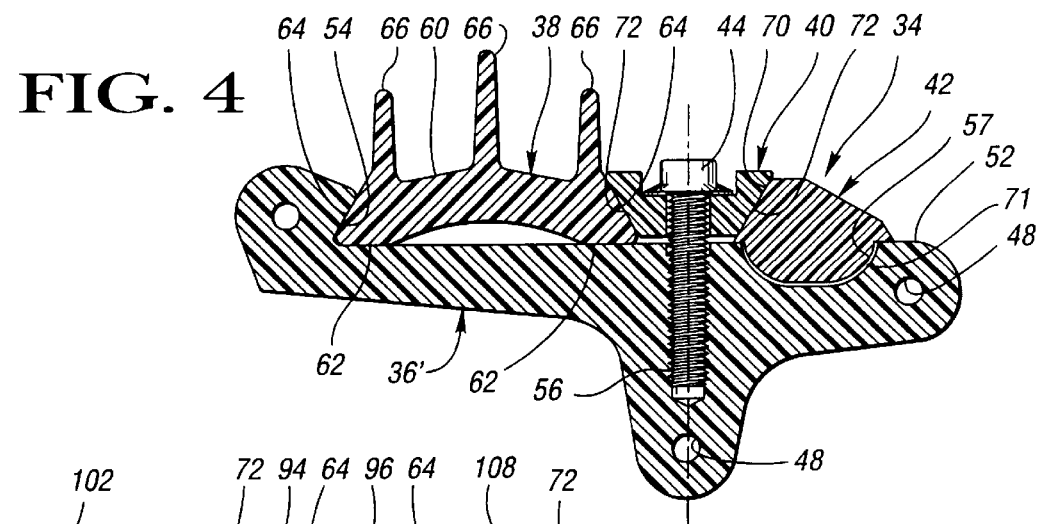
FIG. 4 is a cross-sectional view similar to FIG. 3 but taken laterally adjacent the plane of the attaching bolt.

Referring now to FIGS. 2–4, there is shown a first embodiment of side attachment assembly 34. Assembly 34 includes a support member 36, 36' an end member 38, a wedge member 40, an anchor element 42, and a fastening bolt 44.

As shown in FIG. 2, the support member 36 is secured to a mounting plate 46 as by bolts or rivets, not shown, extending through fastener openings 48. The mounting plate 46 and support member assembly 36 are mounted directly to the right cowl side panel 16 of the vehicle body 10, preferably by spot welding in a specific position as determined by a suitable locating fixture. Alternatively, the support member 36 could be bolted directly to the side panel 16, if it was sufficiently strong, or secured in any other suitable manner.

Similarly, the end member 38 is preferably formed integral with an end cap 50 which is fixed to the end of the tubular cross car beam 26. In this illustration, the cross car beam 26 is only representative of many possible configurations which may be taken by such a beam 26 including, for example, a complex shape as previously discussed. Thus, the end member 38 may be attached to or formed as an integral part of any such cross car beam arrangement and is not limited to the forms shown in the Figures.

The support member 36 as illustrated in FIG. 2 is formed with a generally triangular shape having the three spaced fastener openings 48 extending therethrough. In FIGS. 3 and 4, the support member 36' is modified in that the lower surfaces are partially cut away to reduce the weight of the member without changing its function. In both members 36, 36', the upper side is formed by an upwardly facing planar supporting surface 52 terminated at one end by a raised stop in the form of an acutely angled surface 54 forming an acute angle with the supporting surface 52. As shown in FIG. 4, a threaded bolt opening 56 extends upward through the supporting surface 52. As also shown in FIG. 4, a depending groove recess 57 extends into the supporting surface on the opposite side of the bolt opening 56 from the angled surface 54. FIG. 3 shows a pair of angled recesses 58 extending laterally on opposite sides of the groove recess 57.

The end member 38 has an arched base 60 including a lower supported surface 62 engaging the supporting surface 52 of the support member 36. A pair of acutely angled longitudinally spaced locking surfaces 64 extend upward at acute angles from the supported surface 62. Strengthening ribs 66 extend upward from the base 60 and, along with the base 60, are formed integral with the end cap 50 to provide adequate support for the cantilevered end member 38.

The anchor element 42 is also mounted on the supporting surface 52 and includes angled teeth 68 engaging the angled recesses 58 to hold the anchor element 42 in position on the support member 36. An acutely angled surface 70 is provided extending upwardly and at an acute angle to a lower surface of the anchor element 42 which engages the supporting surface 52 of the support member. On the longitudinal axis through the fastening bolt 44, shown in FIG. 4, a depending web 71 extends downward into the groove recess 57 to prevent lateral motion of the anchor element 42.

The wedge member 40 is of generally rectangular configuration and includes front and rear angled surfaces 72, one of which engages the angled surface 70 of the anchor element 42 and the other of which engages the angled rear locking surface 64 of the end member 38.

The support member 36 further includes an outer wall 74, shown in FIG. 2, which extends upward from the supporting surface 52 and longitudinally from the acutely angled surface 54 to the distal end of the supporting surface 52. Outer wall 74 is formed with a slight inward taper or angle forming a wedge having its minimum thickness at the distal end of the supporting member 36, which is the rear end as installed in a vehicle, and increasing in thickness toward the acutely angled surface 54. The amount of the variation in thickness is small, possibly only four or five millimeters, and the angle of the wedge is matched by a similar angle formed on the outer end or surface of the end member 38 which mounts on the support member 36.

Formation of the side attachment assemblies 34 from the elements so far described is, of course, completed only upon assembly of an associated cross car beam 26 into a vehicle. This requires that the vehicle body 10 be provided with a pair of support members 36 mounted on opposite cowl side panels 16, 18 and a corresponding pair of end members 38 mounted on opposite ends of the cross car beam 26 and forming parts of the beam assembly 24. As best shown in FIG. 1, the beam assembly 24 with all its attached components including the instrument panel 28 is moved sideways into the vehicle body 10 through a door opening and then carried forward in the direction of the arrow 76 until the support surfaces 62 of the end members 38 are placed into engagement with the supporting surfaces 52 of the support members 36 or 36'. The whole beam assembly 24 is then slid forward, with the end members 38 sliding on the support members 36 until the forward angled locking surfaces 64 of the end members 38 engage the acutely angled surfaces 54 of the support members 36. During this forward sliding motion, one of the slightly angled wedges formed by the outer walls 74 of the support members 36 may engage the corresponding angled end of the associated end member 38 to guide the beam assembly 24 laterally as it slides forward into a relatively centered position within the vehicle body 10, some small clearance being provided to allow for tolerance variations in the body itself.

After positioning of the beam 26 in the forward and final position, the anchor elements 42 are placed in their locking positions on their support members 36 and the wedge members 40 are placed so that their angled surfaces 72 engage surfaces 70 of the anchor elements 42 and the rear locking surfaces 64 of the end members 38. Bolts 44 are then installed through openings in the wedge members 40 into engagement with the threaded bolt openings 56 of the support members 36 and tightened down so that the wedge members 40 acting against the anchor elements 42 lock the end members 38 tightly in position on the support members 36. It should be noted that similar wedge members 40 are used for both side attachment assemblies on both ends of the beam assembly 24 for the embodiment illustrated in FIGS. 1–3 of the drawings.

Figure 5:
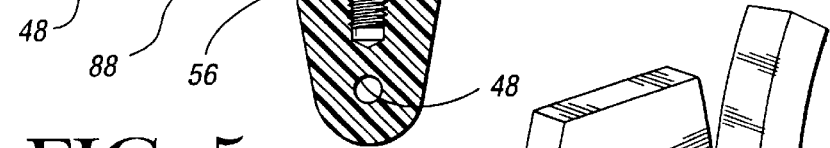
FIG. 5 is a cross-sectional view similar to FIGS. 3 and 4 but showing an alternative embodiment of side attachment assembly.
Figure 6:
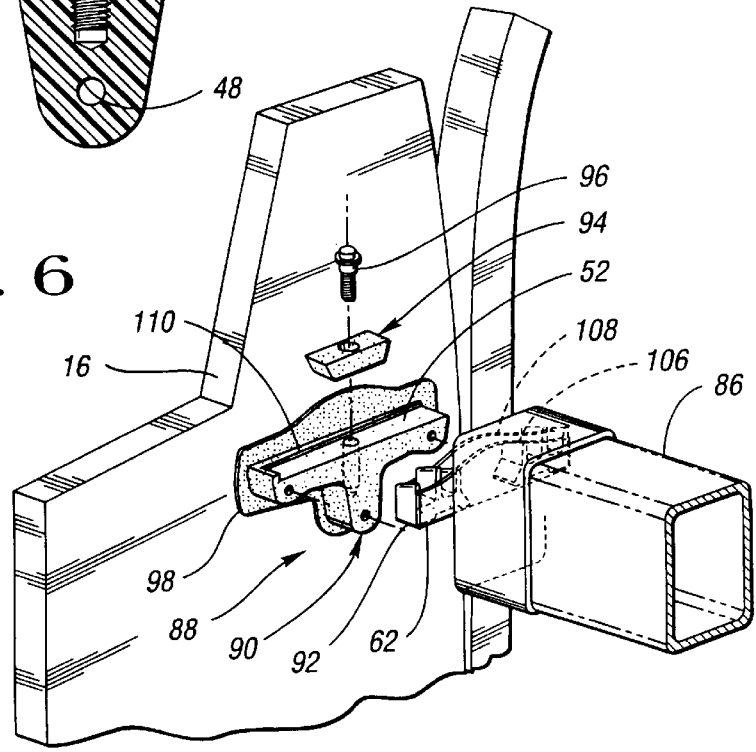
FIG. 6 is an exploded perspective view similar to FIG. 2 but showing the relation of the side attachment assembly elements of FIG. 5 to the vehicle cowl and cross car beam.

Referring now to FIGS. 5–8 there are shown second and third related but differing embodiments of side attachment assemblies utilized in conjunction with a representative cross car beam 86. FIGS. 5 and 6 show the second embodiment of side attachment assembly 88 which includes a support member 90, end member 92, wedge member 94 and a fastening bolt 96. As in the previous embodiments, the support member 90 may be secured by bolts or rivets not shown to a mounting plate 98 which is then welded to one of the cowl side panels 16, 18 of an associated vehicle body 10.

The support member 90 is functionally similar to those previously described in that it includes a supporting surface 52 and has a raised stop 100 at one end which, however, has a vertical stop surface instead of the angled surface of the previous embodiments. A threaded bolt opening 56 through the supporting surface 52 is provided as are fastener openings 48 for mounting the support member 90 on the mounting plate 98. The associated end member 92 differs in that it provides front and rear locking portions 102, 104 interconnected by inner and outer side walls 106, 108. A supported surface 62 is provided on the portions 102, 104 and engages the support surface 52 of the support member 90. The wedge member 94 is rectangular as is wedge 40 but could have an extended length with angled front and rear locking surfaces 72 engaging acutely angled longitudinally spaced locking surfaces 64 formed on the inner edges of the locking portions 102, 104. The support member 90 also includes a wedge shaped inner wall 110, which extends for the length of the support surface 52 and angles slightly inward about four or five millimeters from the rear end of the support member 90 to its front end at the raised stop 100. The outer end of the associated end member 92 is angled with the same slope as that of the inner wall 110.

Figure 7:
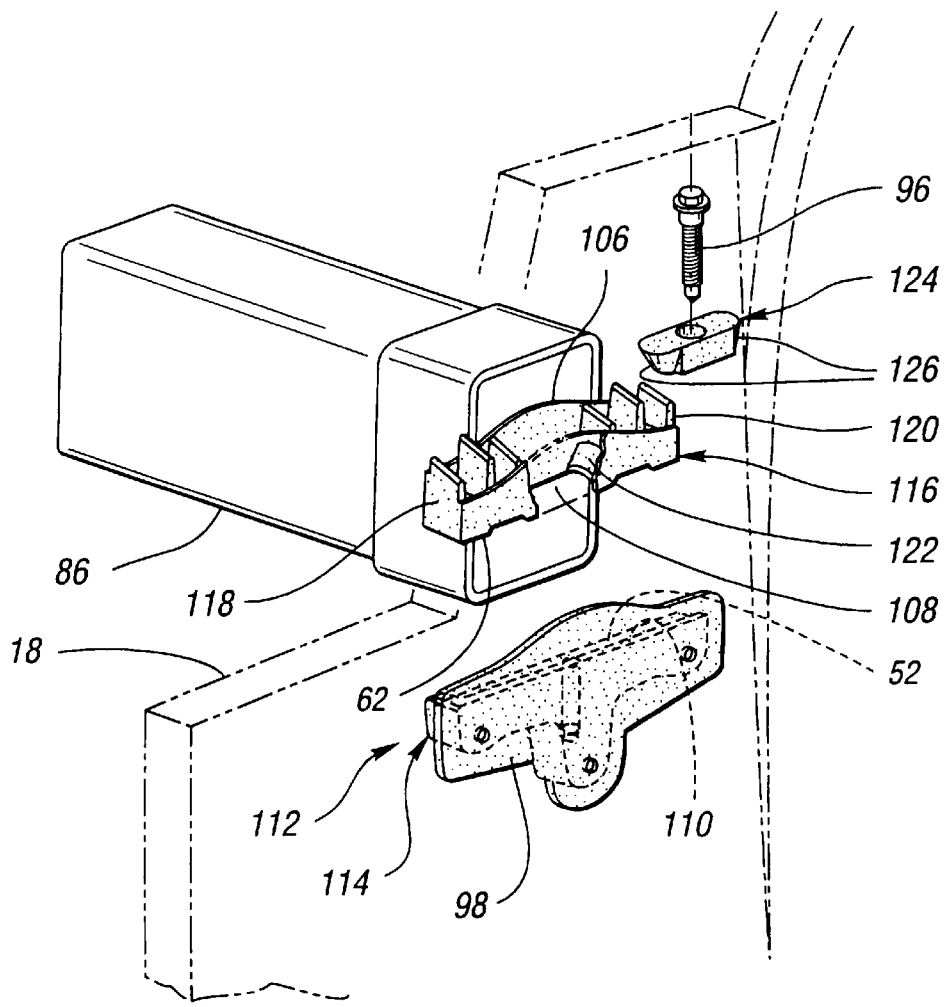
FIG. 7 is an exploded perspective view of the opposite end of the beam assembly of FIG. 6 showing the relation of alternative side attachment assembly elements to the vehicle cowl and cross car beam.
Figure 8:
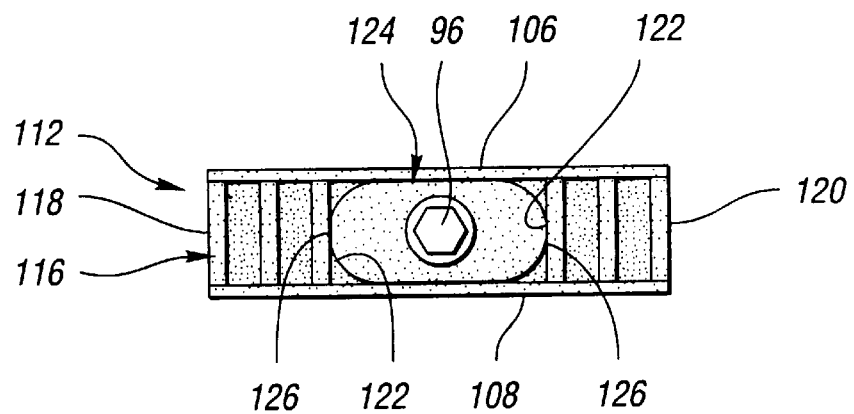
FIG. 8 is a top view of the side attachment assembly of FIG. 7 illustrating the positioning of the wedge member in relation to the mounted end member.

FIGS. 7 and 8 illustrate the third alternative embodiment of side attachment assembly generally indicated by numeral 112. Assembly 112 includes a support member 114 which is a mirror image of and functionally identical with support member 90 previously described. The associated end member 116 is also similar to the end member 92 previously described in that it includes front and rear locking portions 118, 120 with inner and outer side walls 106, 108. The end member 116 differs in that the planar locking surfaces 64 of the previous embodiments are replaced by semi-conical recesses 122. Support member 114 is shown secured to a mounting plate 98 that is welded to the cowl side panel 18. The associated wedge member 124 also differs in that the longitudinal ends thereof are formed as semi-conical portions 126 which mate in assembly with the semi-conical recesses 122 of the end member 116. Wedge member 124 may also be called a conic locator.

The assembly of the cross car beam 86 into a vehicle is similar to that previously described. The beam 86 and its attached end members 92, 116 are moved forward until the supported surfaces 62 of the end members 92, 116 are in engagement with the supporting surfaces 52 of the support members 90, 114 and the beam assembly is then slid forward until the end members 92, 116 approach or contact the raised stops 100 of the support members 90, 114. A rectangular wedge 94 is then placed into engagement with the end member 92 while a conic locator rectangular wedge 124 is placed into engagement with the semi-conical recesses 122 of the end member 116. Both wedges 94, 124 are then secured to their respective support members 90, 114 by bolts 96 extending through openings in the wedge members 94, 124 into the threaded openings 56 of the support members 90, 114. As before, the tapered or angled inner walls 110 of the support members 90 tend to center the beam assembly 86 laterally as it is being moved forward into its final position.

Upon tightening of the bolts of the respective wedge members 94, 124, the bolt 96 of wedge 124 is tightened first. This causes the semi-conical ends 126 engaging recesses 122 to locate the (in this case) left hand end of the beam assembly laterally as well as longitudinally and vertically so that the beam 86 is precisely positioned in the car body with respect to the support member 114. Subsequently bolt 96 of the wedge 94 is tightened which causes its angled surfaces 72, engaging surfaces 64 of the end member 92, to center and position the end member 92 in a fixed longitudinal and vertical position. The assembly allows some variation in the lateral positioning of the right hand end of the cross car beam 86 so as to accommodate reasonable tolerances in the cross car dimension between the cowl side panels 16, 18.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. Side attachment assembly mounting a cross car support beam in a vehicle body having right hand and left hand cowl panels on which the support beam is supported, said attachment assembly characterized by:

a support member mounted on one of said cowl panels, said support member including an upwardly facing planar supporting surface;

an end member mounted on an end of the support beam, said end member including a lower supported surface engaging the supporting surface of the support member and a pair of acutely angled longitudinally spaced locking surfaces extending upward from said supported surface;

a wedge member engaging at least one of said locking surfaces, the other of said locking surfaces engaging a mating surface on one of said wedge member and said support member for retaining the end member on the supporting surface of said support member; and fastener meansurging said wedge member toward the support member and holding said wedge member against said at least one of the locking surfaces of the end member to maintain all of said members in assembly.

2. Side attachment assembly as in claim 1 wherein said support member includes a upstanding side wall adjacent to said planar supporting surface and closely opposing an end wall of said end member, said side and end walls being angled slightly inward in a forward direction to guide the associated support beam toward a laterally centered location during an installation procedure including sliding the supported surfaces of opposite end members forward on the support surfaces of associated support members.

3. Side attachment assembly as in claim 1 wherein said support member includes a raised stop at a forward end of the supporting surface to limit forward motion of the associated support beam during installation on associated support members.

4. Side attachment assembly as in claim 3 wherein said locking surfaces are disposed on front and rear edges of the end member and said raised stop includes an acutely angled surface forming said mating surface of the support member which is engaged by said other of said locking surfaces of the end member.

5. Side attachment assembly as in claim 4 and including an anchor element on said support member, said anchor element having an angled surface engaged by said wedge member on a side opposite from its engagement with said one of said angled surfaces of said end member.

6. Side attachment assembly as in claim 5 wherein said wedge member is generally rectangular having angled front and rear sides engaging said at least one of said locking surfaces and said angled surface of the anchor element.

7. Side attachment assembly as in claim 5 wherein said anchor element is separate from said support member, said anchor element and said support member having cooperating means locking the anchor element against longitudinal and transverse movement on said support member.

8. Side attachment assembly as in claim 7 wherein said cooperating means include a protrusion on said anchor element engaging a recess in the supporting surface of said support member.

9. Side attachment assembly as in claim 7 wherein said cooperating means include angled teeth extending from said anchor element into mating angled recesses in the supporting surface of said support member.

10. Side attachment assembly as in claim 1 wherein said locking surfaces are disposed on opposed interior edges of a space between front and rear spaced portions of the end member and said wedge member engages both of said locking surfaces.

11. Side attachment assembly as in claim 10 wherein said wedge member is generally rectangular and includes angled front and rear sides engaging the locking surfaces of the end member.

12. Side attachment assembly as in claim 11 wherein said front and rear sides of the wedge member are semi-conical.

13. Side attachment assembly as in claim 12 wherein said locking surfaces of the end member form semi-conical recesses that are engaged by the semi-conical front and rear sides of the wedge member to positively locate the end member laterally as well as longitudinally and vertically.

14. Side attachment assembly as in claim 13 wherein said wedge member has generally vertical lateral side walls interconnecting said semi-conical front and rear sides, said end member including side walls engagable with the lateral side walls of the wedge member and defining laterally opposite sides of said space between the semi-conical recesses.

* * * * *